(12) United States Patent
Mascarenas et al.

(10) Patent No.: US 7,168,899 B2
(45) Date of Patent: Jan. 30, 2007

(54) APPARATUS AND METHOD FOR CENTERING A WORKPIECE ON A MACHINE TOOL

(75) Inventors: Kenneth Edward Mascarenas, Bosque Farms, NM (US); James Henry Madge, Erie, PA (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 10/829,809

(22) Filed: Apr. 22, 2004

(65) Prior Publication Data

US 2005/0238449 A1    Oct. 27, 2005

(51) Int. Cl.
*B23Q 15/00*    (2006.01)
(52) U.S. Cl. .................. 409/221; 409/242; 82/148; 29/27 R
(58) Field of Classification Search ............. 409/221, 409/242, 219, 240; 29/27 R; 82/148, 150, 82/151, 164, 170
See application file for complete search history.

(56) References Cited

U.S. PATENT DOCUMENTS

| | | | |
|---|---|---|---|
| 3,797,175 A | * | 3/1974 | Nicolaus et al. ............ 451/220 |
| 3,810,310 A | * | 5/1974 | Morgan ........................ 74/441 |
| 4,033,210 A | * | 7/1977 | Swenson ..................... 82/148 |
| 6,068,541 A | | 5/2000 | Dwyer |
| 6,607,114 B1 | | 8/2003 | Reser et al. |
| 6,827,631 B1 | * | 12/2004 | Tomotaki et al. ............. 82/148 |
| 2003/0232584 A1 | * | 12/2003 | Tomotaki et al. ........... 451/242 |

FOREIGN PATENT DOCUMENTS

GB    2055641 A  *  3/1981

* cited by examiner

*Primary Examiner*—Dana Ross
(74) *Attorney, Agent, or Firm*—Adams Evans P.A.; Theodore P. Cummings (57) ABSTRACT

An apparatus is provided for centering a workpiece on a machine tool that includes first and second guide plates having respective first and second aligned bores therein for supporting a centering pin mounted therein for axial movement between a retracted position and a use position. The centering pin cooperates with a workpiece such as a fan rotor blade of a turbine engine for positioning the workpiece in a predetermined position relative to a metal shaping operation to be carried out by the machine on the workpiece. At least one spring cooperates with the centering pin for exerting a predetermined axial bias for urging the centering pin into the use position. A lock locks the centering pin in the use position.

6 Claims, 8 Drawing Sheets

APPARATUS AND METHOD FOR CENTERING A WORKPIECE ON A MACHINE TOOL

TECHNICAL FIELD

The present invention relates to an apparatus and method for precisely centering workpieces to be machined or otherwise shaped on a machine tool.

BACKGROUND OF THE INVENTION

The term "airfoil" broadly describes several species of elongate machined parts, such as blades, vanes and nozzles. As used in this application the term "workpiece" is used to describe any object to be shaped while centered on a machine tool, and the term "airfoil" refers to machined parts, such as blades, vanes and the like that are incorporated into fanjet engines, gas turbines and the like. This application describes the invention in the particular environment of the manufacture of airfoils. Such airfoils must be precisely machined to a predetermined aerodynamic shape having critical tolerances that must be duplicated from airfoil to airfoil. At the high rotational speeds of operation found in turbine engines, any excessive deviation from the required shape can cause high rates of wear, vibration and even catastrophic failure. Care is therefore required in mounting, for example, a blank in a machine tool, or fixture, where the blank will be machined into an airfoil such as a jet engine blade or vane.

As disclosed and explained in this application by way of example, an improved apparatus and method is provided for centering a workpiece such as a fan rotor blade in a fixture for a dovetail machining operation. A fan rotor blade includes a tip, an opposed root and a midspan region extending between the tip and root, and which defines the major longitudinal extent of the blade. A number of details must be machined into the workpiece during formation of the blade. These include a plurality of dovetails formed in the root by which the blade is mounted and secured to the rotor disk of the engine.

Reference is made to applicant's U.S. Pat. No. 6,068,541 that discloses the general machine environment within which the present invention is practiced.

Prior art devices and methods for centering workpieces for a machining operation include an operator-manipulated hand screw used to tighten a centering pin against a tip-locating block temporarily mounted on the tip of the workpiece to be shaped into the airfoil. This centering method introduces an unavoidable degree of variation into the workpiece loading process because no two operators will have the same "feel" for the proper clamping technique. Typically, prior art practices result in a varying amount of torque being applied to the hand screw, and thus a varying amount of tension directed along the stack axis of the workpiece during machining. Insufficient tension on the workpiece can result in movement during the process of clamping the workpiece into a stationary position and a mislocation relative to the workpiece-engaging milling tools. Similarly, excessive tension can result in distortion of the workpiece, deviation from the required stack axis location and misalignment of subsequently-machined features on the workpiece.

BRIEF DESCRIPTION OF THE INVENTION

In one embodiment of the invention an improved method and apparatus is provided for centering a workpiece on a machine tool, or fixture.

In another embodiment of the invention, a method and apparatus is provided for centering a workpiece that exerts a constant, repeatable tension on the workpiece during the mounting and centering process.

According to one aspect of the invention, an apparatus is provided for centering a workpiece on a machine tool that includes first and second guide plates having respective first and second aligned bores therein for supporting a centering pin mounted therein for axial movement between a retracted position and a use position. The centering pin cooperates with a workpiece for positioning the workpiece in a predetermined position relative to a metal shaping operation to be carried out by the machine on the workpiece. At least one spring cooperates with the centering pin for exerting a predetermined axial bias for urging the centering pin into the use position. A lock locks the centering pin in the use position.

According to another aspect of the invention first and second guide plates are provided having respective first and second aligned bores therein for supporting a centering pin mounted therein for axial movement between a retracted position and a use position. The centering pin cooperates with a workpiece for positioning the workpiece in a predetermined position relative to a milling operation to be carried out by the machine on the workpiece. At least one flat, triple beam spring cooperates with a rear end of the centering pin for exerting a predetermined axial bias for urging the centering pin in a forward direction into the use position. A lock is provided for locking the centering pin in the use position.

According to another aspect of the invention, an apparatus is provided for centering a turbine engine blade on a metal milling machine, and includes first and second guide plates having respective first and second aligned bores therein for supporting a centering pin mounted therein for axial movement between a retracted position and a use position. The centering pin cooperates with a blade for positioning the blade in a predetermined position relative to a milling operation to be carried out by the machine on the blade. At least one flat, triple beam spring cooperates with a rear end of the centering pin for exerting a predetermined axial bias for urging the centering pin in a forward direction into the use position. A tip locator block having an angled inset matching a taper on a front end of the centering pin is provided for receiving the taper therein, and a blade-receiving mount is provided for being positioned on an end of the blade to be supported in a fixed position during milling. A locking strap is extended over the top of the centering pin from one radial side to the other and is moveable between a release position allowing axial movement of the centering pin and a lock position for locking the centering pin in the use position. An actuator in the form of a hydraulic cylinder is operatively connected to one end of the locking strap for selectively moving the strap between a release position wherein the centering pin is axially moveable and the lock position.

DETAILED DESCRIPTION AND BEST MODE OF THE INVENTION

Figure 1:
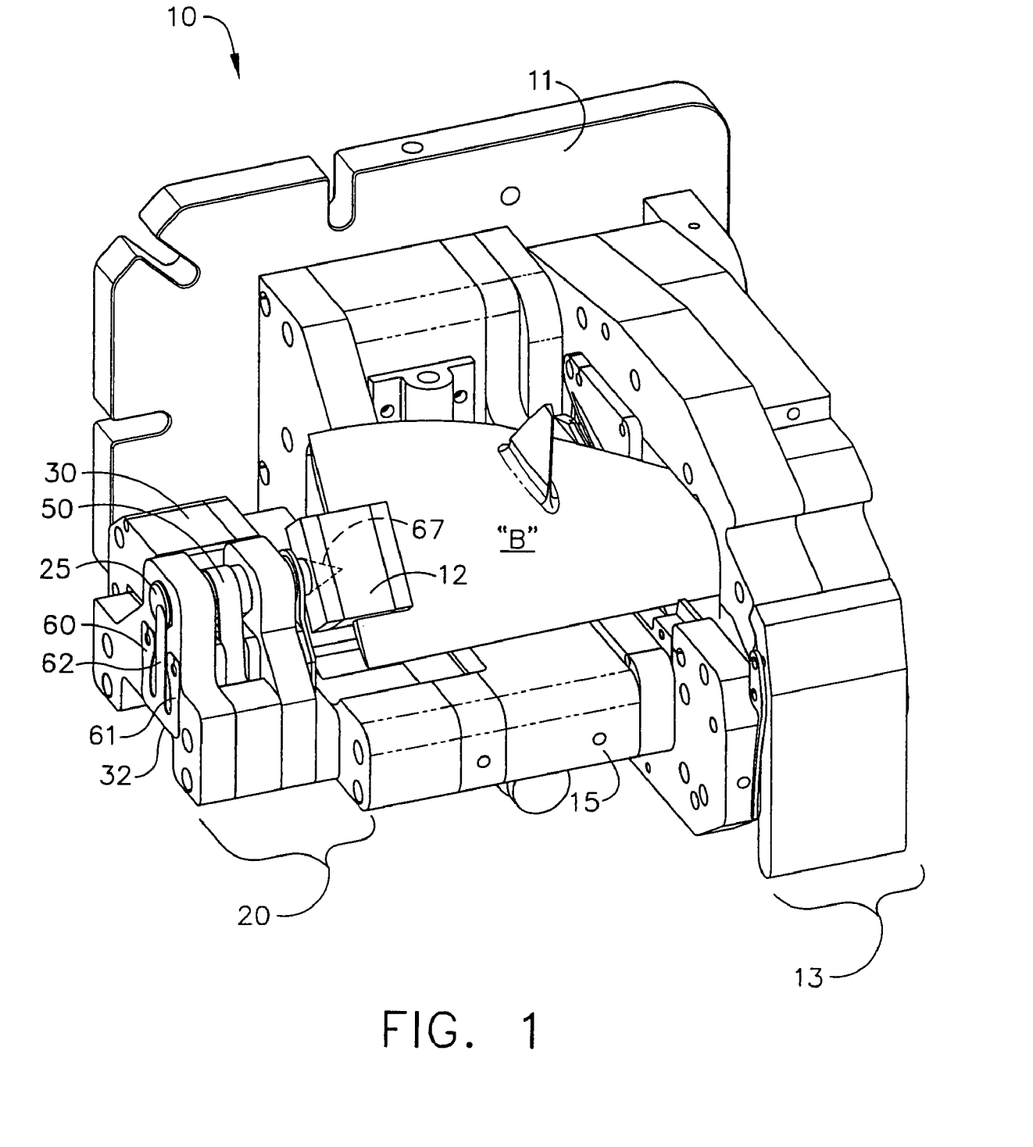
FIG. 1 is a perspective view of a dovetail milling fixture including a centering apparatus according to an embodiment of the invention, showing the tip portion of a fan blade mounted therein.
Figure 2:
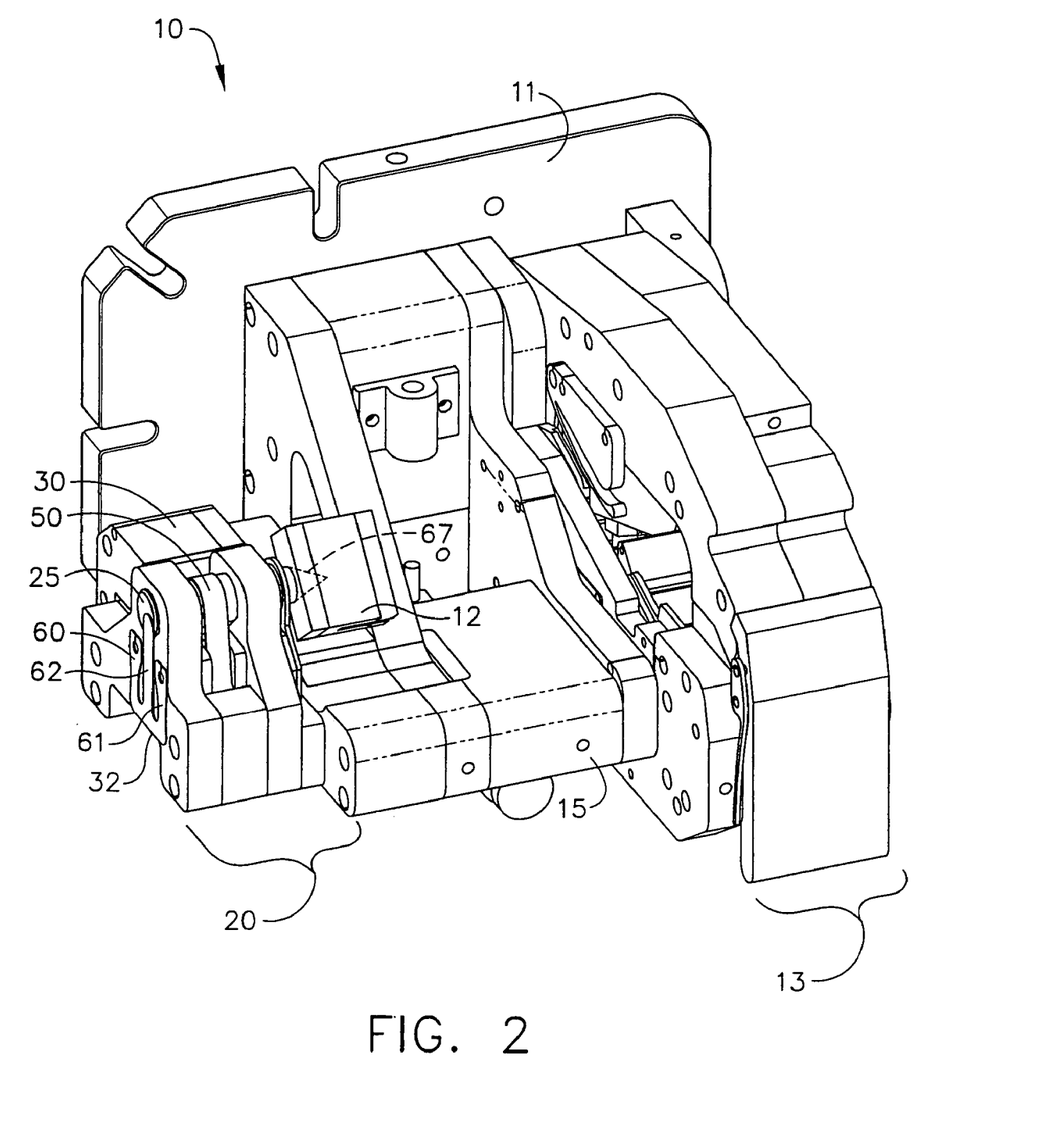
FIG. 2 is a perspective view according to FIG. 1 with the fan blade removed for clarity.
Figure 3:
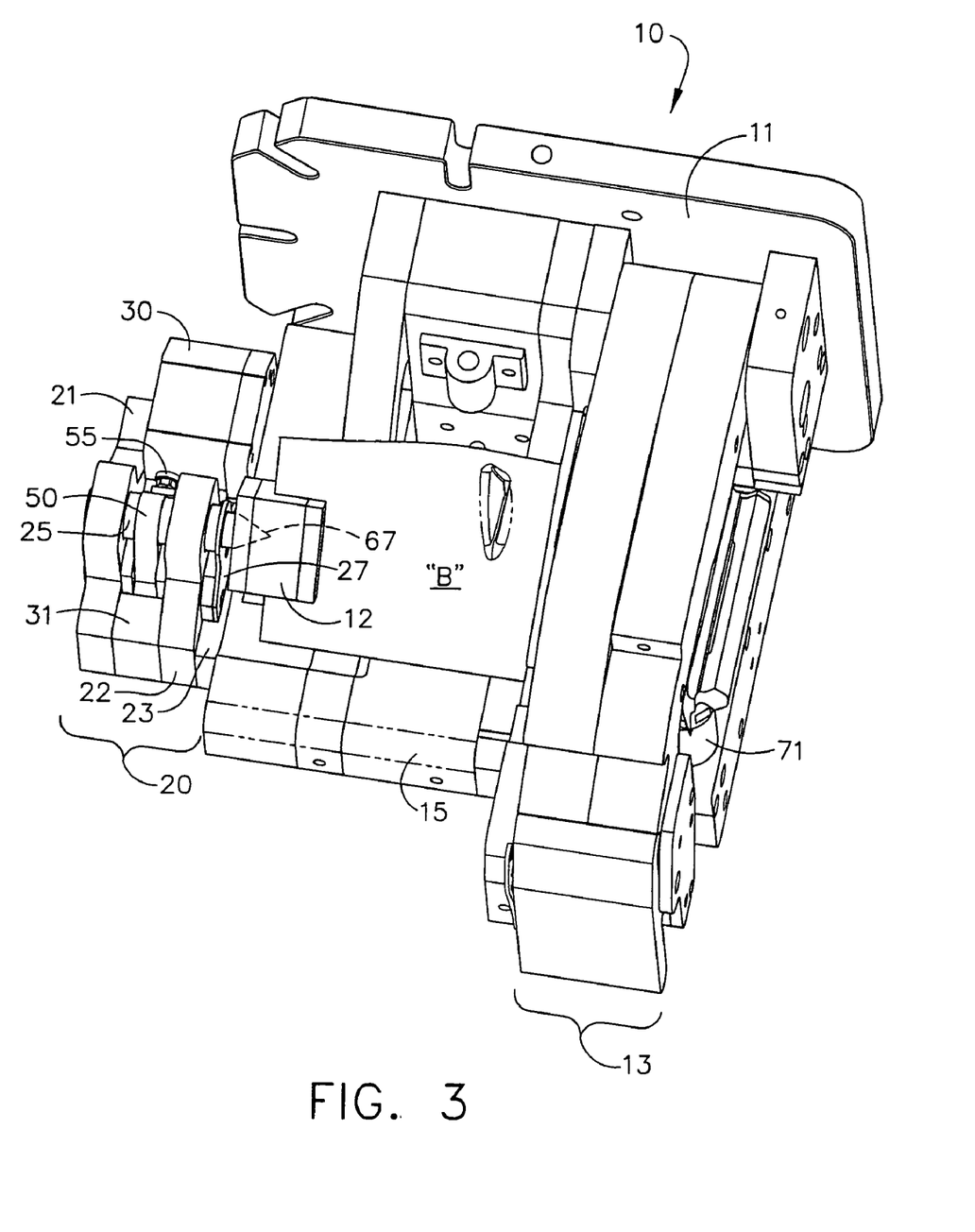
FIG. 3 is another perspective view of the fixture with a blade mounted thereto.
Figure 4:
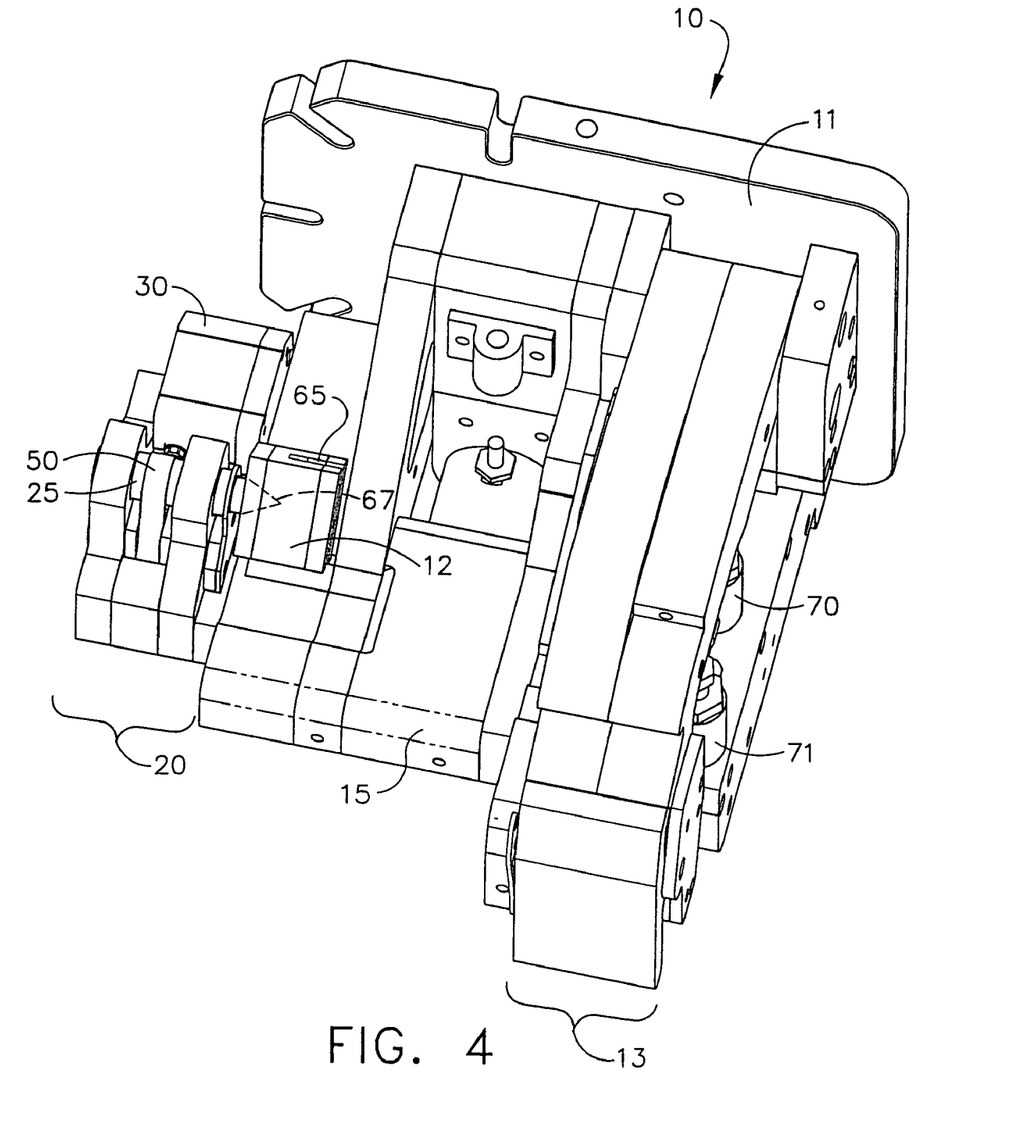
FIG. 4 is a view according to FIG. 3 with the fan blade removed for clarity.
Figure 5:
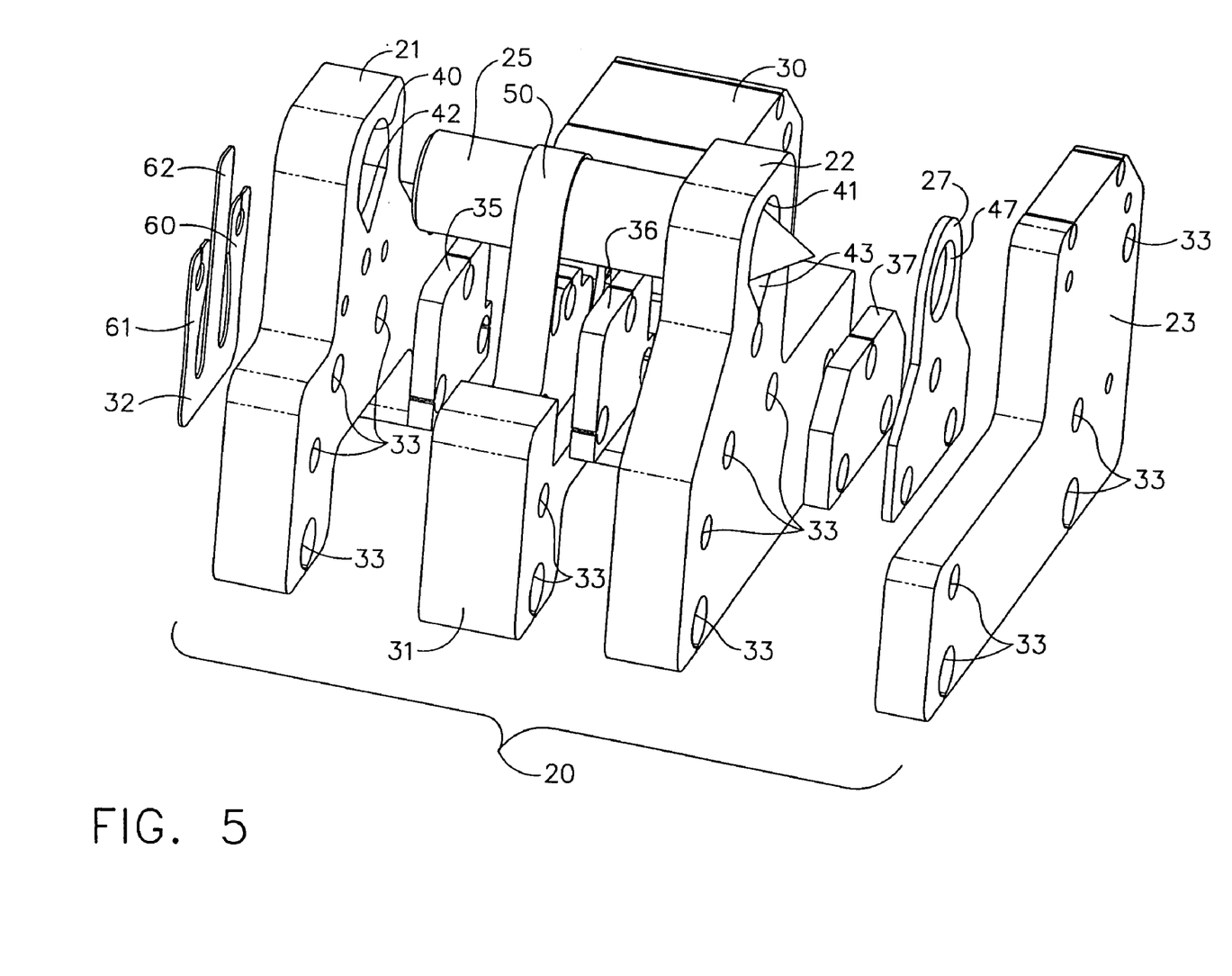
FIG. 5 is an exploded view of the centering apparatus portion of the fixture shown in FIGS. 1–4.

Referring now to FIGS. 1–4 of the drawings, a milling fixture for centering and clamping in position a fan rotor blade "B" is shown generally at reference numeral 10. The fixture 10 includes a mounting plate 11 by which the fixture 10 is mounted to a support, not shown. The fixture 10 as shown in FIG. 1 mounts the blade "B" by means of a tip mounting block 12 that engages a centering apparatus 20 according to an embodiment of the invention, and an opposed mounting block 13 by which the root end of the blade "B" is located and fixed in a stationary position. The mounting block 13 and centering fixture 20 are each mounted on a base 15. With the blade properly mounted in the fixture 10, milling operations are performed on the blade.

The centering apparatus 20 is shown in greater detail in FIGS. 5–8. The centering apparatus 20 includes a pair of guide plates 21, 22, a mounting plate 23, a centering pin 25, a pin stop 27, a hydraulic locking assembly 30, including a locking plate 31, and a triple-beam flat spring 32. The guide plates 21, 22, mounting plate 23, pin stop 27, and locking assembly 30 are joined by bolts, not shown, extending through suitably-positioned bolt holes 33 and attached to the base 15 of the fixture 10. Spacers 35, 36, 37 provide proper spacing between the above-described elements.

The guide plates 21, 22 are provided with respective bores 40, 41 therein within which the centering pin 25 is mounted for limited movement along its longitudinal axis. Bores 40, 41 include respective V-nests 42, 43 that provide a stable support for the centering pin 25 by reducing the surface area of contact and thus increasing the force per unit of area with which the centering pin 25 is engaged with the guide plates 21, 22.

Figure 6:
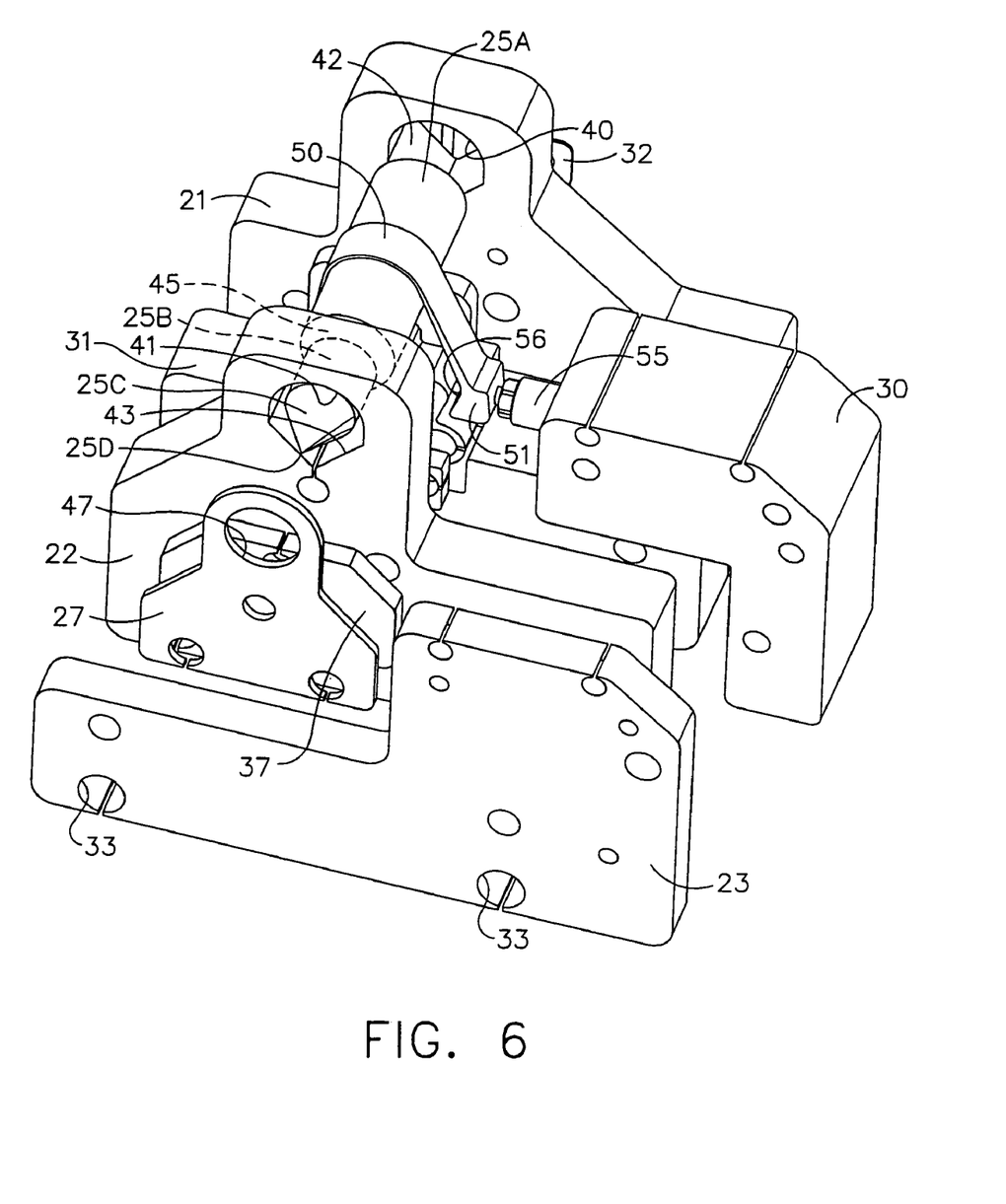
FIG. 6 is another exploded view of the centering apparatus shown in FIGS. 1–4.
Figure 7:
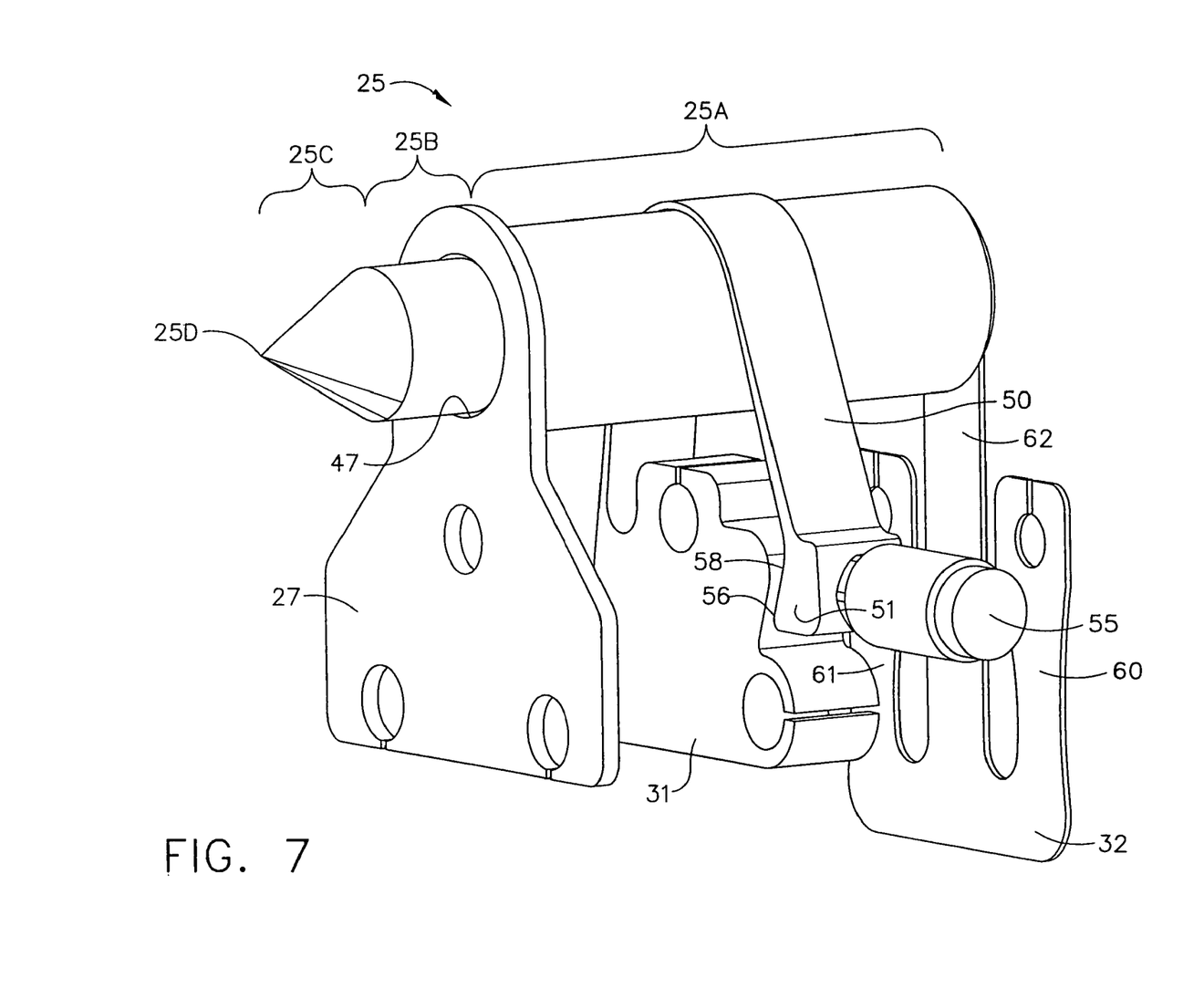
FIG. 7 is another perspective view of the centering apparatus showing the clamping portion of the apparatus.
Figure 8:
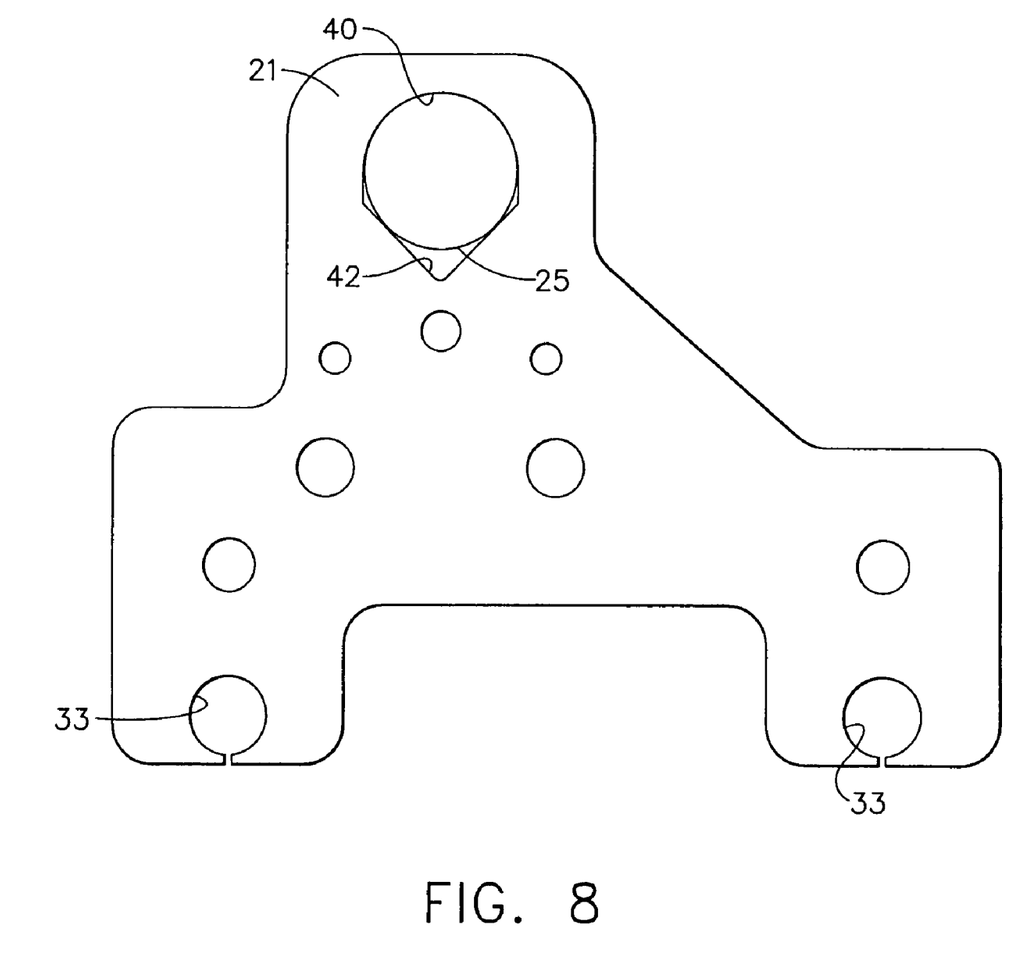
FIG. 8 is a front elevation of the front guide plate of the centering apparatus.

As is best shown in FIGS. 6 and 7, the centering pin 25 includes a large diameter portion 25A, a relatively small diameter portion 25B defined by a shoulder 45, and a tapered portion 25C terminating at a sharp tip end 25D. The small diameter portion 25B of the centering pin 25 provides clearance between the centering pin 25, the bore 41 in guide plate 22 and a bore 47 in the pin stop 27. The bore 47 in the pin stop 27 has a diameter greater than the diameter of the small diameter portion 25B of the centering pin 25 and thus provides a stop reference point defining the limit of axial movement of the centering point towards the blade.

Continued reference to FIGS. 6 and 7 further illustrates the locking assembly 30. The locking plate 31 carries a locking strap 50 that extend over the centering pin 25 and engages the large diameter portion 25A. The locking strap is integrally-formed with the locking plate 31 and is preferably fabricated of D2 tool steel having a hardness of between 48–52 on the Rockwell C scale.

The free end 51 of the locking strap 50 is pinned to an actuator in the form of a hydraulic cylinder 55. The locking plate 31 is provided with a downwardly tapered surface 56 that cooperatively engages a curved inner surface 58 of the free end 51 of the locking strap 50. Thus, actuation of the cylinder 55 forces engagement between the free end 51 of the locking strap 50 against the tapered surface 56, causing the inward force to be translated into a downward shearing force along the tapered surface 56, thus tightening the strap against the centering pin 25, and in turn forcing the centering pin 25 into a locked position against the V-nests 42, 43 of the guide plates 21, 22.

In accordance with the best mode of the invention, the triple-beam spring 32 is mounted on the rear side of the guide plate 21. See FIGS. 1, 5 and 7. The spring 32 is preferably fabricated of 1095 blue spring steel, 0.77 mm (0.030 inch) thick. The spring has two beams 60, 61 that are bolted to the guide plate 21 and a centrally-disposed beam 62 that is formed with a predetermined bend biased towards the guide plate 21. When mounted flat against the guide plate 21 the beam 62 is forced out of its bent position into a torqued position exerting a predetermined reactive force against the end of the centering pin 25. This force is predictable and uniform, thus exerting a correspondingly predictable and uniform force on the centering pin 25 along its longitudinal axis and parallel to the stack axis of the blade.

During setup the blade is positioned in the fixture 10 against several fixed locators with the tip of the blade positioned in a slot 65 in the tip mounting block 12. Compare FIGS. 3 and 4. The tip mounting block 12 has a machined inset 67 that has an angle of taper that matches the taper of the tapered portion 25C of the centering pin 25. Positioning the centering pin 25 in the inset 67 provides a positive mounting location for the tip of the blade. The constant, uniform force applied by the beam 62 against the rear end of the centering pin 25 produces a constant alignment force from blade to blade. In a preferred embodiment of the invention, the spring beam 62 exerts a force of 20 pounds. However, the magnitude of the force is not critical so long as the force is sufficient to firmly set the tapered portion 25C of the centering pin 25 firmly into the inset 67 of the tip mounting block 12.

With the centering pin 25 positioned in the inset 67 of the tip mounting block 12, the blade is located and clamped into the fixture 10 with hydraulic cylinders, including the hydraulic cylinder 55 and primary hydraulic cylinders 70 and 71 mounted on the mounting block 13. The actuation of the hydraulic cylinders is sequenced so that the locking strap 50 is engaged before the primary hydraulic cylinders. This ensures that the stack axis alignment of the blade is correct before actuation of the primary hydraulic cylinders, including cylinders 70, 71.

An apparatus and method for centering a workpiece such as a fan blade is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. Apparatus for centering a workpiece on a machine tool, comprising:
   (a) first and second guide plates having respective first and second aligned bores therein supporting a centering pin mounted therein for axial movement between a retracted position and a use position, wherein the centering pin is adapted to cooperate with a workpiece for positioning the workpiece in a predetermined position relative to a metal shaping operation to be carried out by the machine tool on the workpiece;
   (b) at least one spring cooperating with the centering pin and exerting a predetermined axial bias urging the centering pin into the use position; and
   (c) a lock adapted to selectively lock the centering pin in the use position and prevent axial motion thereof during the metal shaping operation, wherein the lock comprises a locking strap extended over the top of the centering pin from one radial side to the other and moveable between a release position allowing axial movement of the centering pin and a lock position for locking the centering pin in the use position.

2. An apparatus according to claim 1, and including an actuator operatively connected to one end of the locking strap for selectively moving the strap between the release position and the lock position.

3. An apparatus according to claim 1, wherein each of the guide plate bores defines a V-nest for supporting the centering pin in two horizontally spaced-apart positions.

4. Apparatus for centering a workpiece on a machine tool, comprising:
   (a) first and second guide plates having respective first and second aligned bores therein supporting a centering pin mounted therein for axial movement between a retracted position and a use position, wherein the centering pin is adapted to cooperate with a workpiece for positioning the workpiece in a predetermined position relative to a metal shaping operation to be carried out by the machine tool on the workpiece;
   (b) at least one spring cooperating with the centering pin, wherein the spring comprises a triple beam spring having a centrally-disposed beam biased against a rear end of the centering pin for urging the centering pin into the use position; and
   (c) a lock adapted to selectively lock the centering pin in the use position and prevent axial motion thereof during the metal shaping operation.

5. An apparatus according to claim 4, wherein the spring is mounted on the first guide plate with the centrally-disposed beam positioned within the perimetrical plane of the first guide plate bore.

6. Apparatus for centering a workpiece on a machine tool, comprising:
   (a) first and second guide plates having respective first and second aligned bores therein supporting a centering pin mounted therein for axial movement between a retracted position and a use position, wherein the centering pin is adapted to cooperate with a workpiece for positioning the workpiece in a predetermined position relative to a metal shaping operation to be carried out by the machine tool on the workpiece;
   (b) at least one spring cooperating with the centering pin and exerting a predetermined axial bias urging the centering pin into the use position; and
   (c) a lock adapted to selectively lock the centering pin in the use position and prevent axial motion thereof during the metal shaping operation; and
   (b) a tip mounting block having an angled inset matching a taper on a front end of the centering pin and adapted to be received onto the taper of the centering pin, and a blade-receiving slot adapted to be positioned on an end of a turbine engine airfoil to be supported in a fixed position during milling.

\* \* \* \* \*